United States Patent
Liu et al.

(10) Patent No.: US 11,430,253 B2
(45) Date of Patent: Aug. 30, 2022

(54) ELECTRONIC DEVICE FOR IN-DISPLAY BIOMETRIC FEATURE RECOGNITION

(71) Applicant: InnoLux Corporation, Miao-Li County (TW)

(72) Inventors: Yu-Tsung Liu, Miao-Li County (TW); Hui-Ching Yang, Miao-Li County (TW); Te-Yu Lee, Miao-Li County (TW)

(73) Assignee: InnoLux Corporation, Miao-Li County (TW)

(*) Notice: Subject to any disclaimer, the term of this patent is extended or adjusted under 35 U.S.C. 154(b) by 0 days.

(21) Appl. No.: 17/135,889

(22) Filed: Dec. 28, 2020

(65) Prior Publication Data

US 2021/0216743 A1    Jul. 15, 2021

(30) Foreign Application Priority Data

Jan. 15, 2020 (CN) .......................... 202010042606.7

(51) Int. Cl.
*G06V 40/13* (2022.01)
(52) U.S. Cl.
CPC ................................ *G06V 40/1318* (2022.01)

(58) Field of Classification Search
None
See application file for complete search history.

(56) References Cited

U.S. PATENT DOCUMENTS

| | | | |
|---|---|---|---|
| 8,427,464 B2 | 4/2013 | Brown | |
| 2014/0339400 A1* | 11/2014 | Maeda | G06F 3/042 250/214 C |
| 2019/0005295 A1* | 1/2019 | Jia | H01L 27/3244 |
| 2021/0019016 A1* | 1/2021 | Ding | G09G 3/3225 |
| 2021/0034832 A1* | 2/2021 | Lee | G06K 9/0004 |
| 2021/0109639 A1* | 4/2021 | Hsieh | G06F 3/04164 |
| 2021/0117638 A1* | 4/2021 | Bu | G06F 1/1684 |
| 2021/0200980 A1* | 7/2021 | Xu | G06K 9/00013 |

FOREIGN PATENT DOCUMENTS

| | | |
|---|---|---|
| CN | 101467442 B | 5/2011 |
| CN | 102132233 B | 11/2013 |

\* cited by examiner

*Primary Examiner* — Joseph R Haley
(74) *Attorney, Agent, or Firm* — Winston Hsu

(57) ABSTRACT

An electronic device is provided. The electronic device includes a first substrate, including a non-peripheral area and a peripheral area; a first reset unit, disposed in the peripheral area; and a first integration unit, disposed in the non-peripheral area. The first integration unit includes a first sensing unit, coupled to the first reset unit; and a first pixel unit, coupled to the first sensing unit.

16 Claims, 15 Drawing Sheets

ELECTRONIC DEVICE FOR IN-DISPLAY BIOMETRIC FEATURE RECOGNITION

BACKGROUND OF THE DISCLOSURE

1. Field of the Disclosure

The disclosure relates to an electronic device for in-display biometric feature recognition, and more particularly, to an electronic device integrating biometric feature recognition function with display function.

2. Description of the Prior Art

Existing fingerprint sensors, such as in-display optical fingerprint devices, are stacked by a fingerprint sensing panel, a display panel, and a cover layer. However, such design would make the thickness of the in-display optical fingerprint recognition device too large to meet the requirements of a thin design. Furthermore, the fingerprint sensing panel and the control circuit of the display panel and the related wiring configuration are complicated, which makes it difficult to integrate the display panel and the fingerprint sensing panel. In order to solve the above-mentioned problems, it is necessary to provide an electronic device for in-display fingerprint recognition.

SUMMARY OF THE DISCLOSURE

It is therefore an objective of the disclosure to provide an electronic device for in-display biometric feature recognition.

The disclosure discloses an electronic device. The electronic device includes a first substrate, including a non-peripheral area and a peripheral area; a first reset unit, disposed in the peripheral area; and a first integration unit, disposed in the non-peripheral area. The first integration unit includes a first sensing unit, coupled to the first reset unit; and a first pixel unit, coupled to the first sensing unit.

These and other objectives of the present disclosure will no doubt become obvious to those of ordinary skill in the art after reading the following detailed description of the embodiment that is illustrated in the various figures and drawings.

DETAILED DESCRIPTION

The disclosure can be understood by referring to the following detailed description in conjunction with the accompanying drawings. It should be noted that, in order to make the readers easy to understand and for the simplicity of the drawings, the multiple drawings in the disclosure only illustrate a part of the electronic device. In addition, the number and size of each component in the figure are only for illustration, and are not used to limit the scope of the disclosure.

In the specification and the claims appended of the disclosure, certain terms will be used to refer to particular components. Those skilled in the art should understand that electronic device manufacturers may refer to the same components by different names. This article does not intend to distinguish between components that have the same function but different names.

The term "comprising" or "including" as used throughout the specification and subsequent claims is an open-ended fashion and should be interpreted as "including but not limited to".

It should be understood that when a component or film layer is referred to as being "on" or "connected" to another component or film layer, the component or film layer can be directly on or directly connected to this other component or film layer, or there is an inserted component or film layer between the two (indirect case). Conversely, when a component is said to be "directly" on or "directly connected to" another component or film layer, there is no intervening component or film layer between the two.

It should be understood that when a component or element is referred to as being "coupled" to another component or element, it can be electrically connected to the other component or element, or there may be intervening components or elements between the two (indirectly).

Although the terms first, second, third . . . can be used to describe various components, the components are not limited to these terms. These terms are only used to distinguish a single component from other components in the specification. The same terms may not be used in the claims, and are replaced with first, second, third . . . according to the order declared in the claims. Therefore, in the following description, the first component may be the second component in the claims.

It should be noted that the following embodiments can replace, reorganize, and mix the technical features of several different embodiments without departing from the spirit of the disclosure to complete other embodiments.

Figure 1:
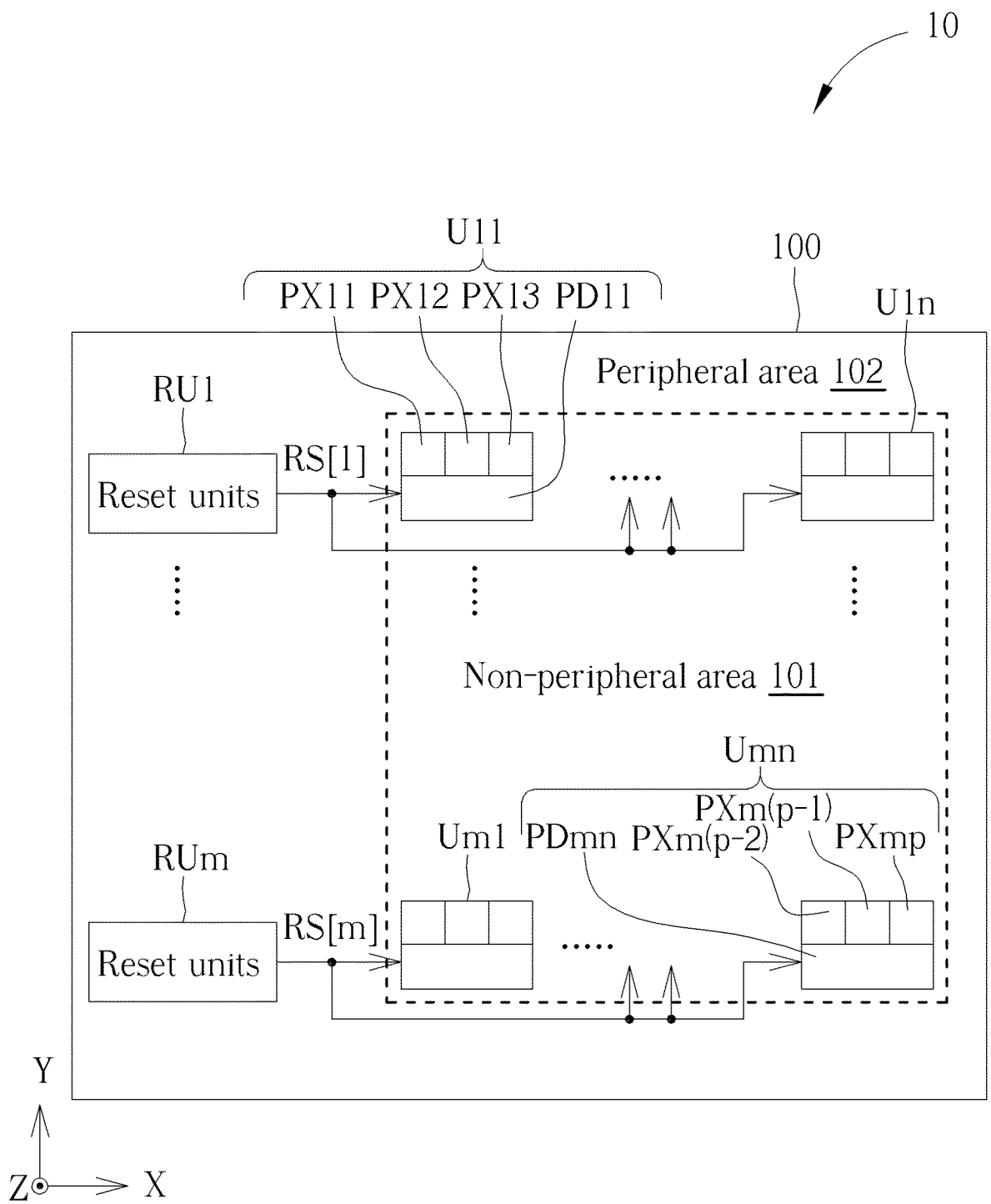
FIG. 1 is a functional block diagram of an electronic device according to an embodiment of the disclosure.

FIG. 1 is a functional block diagram of an electronic device 10 according to an embodiment of the disclosure. The electronic device 10 may be an optical in-display biometric feature recognition device (e.g., mobile phones, tablet computers, notebook computer, etc.) for sensing a biological feature, but is not limited thereto. The following embodiments take fingerprint recognition as an example, but the disclosure is also applicable to other suitable biological feature recognition. The electronic device 10 includes a substrate 100. The substrate 100 includes a non-peripheral area 101 and a peripheral area 102, wherein the non-peripheral area 101 includes pixel units PX11, PX12, PX13 with a non-self-luminous or self-luminous display function. The pixel units PX11, PX12, PX13 with self-luminous display function can be, for example, organic light emitting diode (OLED), inorganic light emitting diode (e.g. mini-LED, micro-LED, quantum dot light emitting diode (QD-LED)), or other suitable type. The substrate 100 is parallel to an XY plane, wherein the XY plane is formed by a direction X and a direction Y, and a direction Z is perpendicular to the direction X and the direction Y.

There are m*n integration units U11 . . . U1$n$, U21 . . . U2$n$, Um1 . . . Umn in the non-peripheral area 101, such as a matrix arrangement along the X direction and the Y direction. Each integration unit has similar structure and design; for example, components for sensing and display, including the pixel PX11, the pixel unit PX12, the pixel unit PX13 and a sensing unit PD11, are integrated within the integration unit U11. By the same token, the integration unit Umn includes a pixel unit PXm (p−2), a pixel unit PXm (p−1), a pixel unit PXmp, and a sensing unit PDmn. In other embodiments, the structure and circuit design of each integration unit may be different, but it is not limited thereto. Besides, m, n, and p are positive integers greater than zero. Each pixel unit may be an area emitting a single color light, and includes stacked layers corresponding to the area. In one embodiment, the pixel unit PX11 is a blue pixel unit, the pixel unit PX12 is a green pixel unit, and the pixel unit PX13 is a red pixel unit, but it is not limited thereto.

The peripheral area 102 can be regarded as a control circuit area. M reset units RU1 . . . RUm are disposed in the peripheral area 102, and are coupled to the sensing units PD11 . . . PD1$n$, PD21 . . . PD2$n$, PDm1 . . . PDmn in the non-peripheral area 101, to respectively output m reset signals RS[1] . . . RS[m] to correspondingly connected sensing units. In one embodiment, the reset unit RU1 is connected with the n sensing units PD11 . . . PD1$n$ in the first row, and therefore the reset signal RS[1] may control the n sensing units PD11 . . . PD1$n$ in the first row to be reset. By the same token, the reset unit RUm is connected with the n sensing units PDm1 . . . PDmn in the m-th row, and therefore the reset signal RS[m] may control the n sensing units PDm1 . . . PDmn in the m-th row to be reset.

The disclosure is advantageous in that the disclosure may integrate the display function and the fingerprint recognition function in the electronic device 10. The disclosure is further advantageous in that the reset units RU1 . . . Rum are disposed in the peripheral area 102, which increases available area of the integration units U11 . . . Umn (e.g. the sensing units PD11 . . . PDmn and the pixel units PX11 . . . PXmp) in the non-peripheral area 101, so as to improve fingerprint recognition performance and display performance of the non-peripheral area 101. The disclosure is further advantageous in that the sensing unit PD11 . . . PDmn and the pixel units PX11 . . . PXmp may be disposed on the same substrate (e.g., the substrate 100), to reduce the number of stacked layers required by the electronic device 10, such that a size of the electronic device 10 in the direction Z is reduced.

Figure 2:
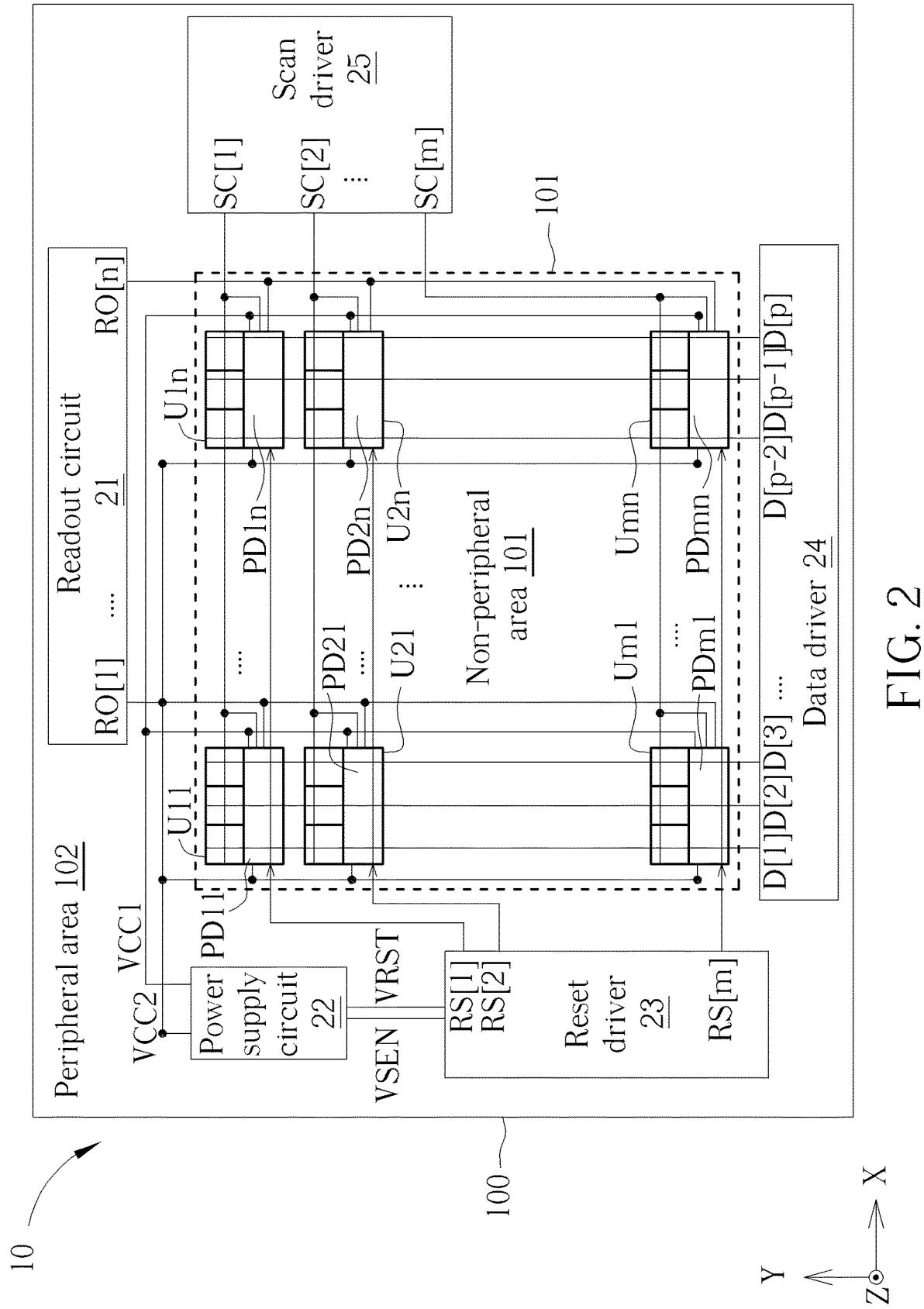
FIG. 2 is a functional block diagram of the electronic device in FIG. 1 according to an embodiment of the disclosure.

FIG. 2 is a functional block diagram of the electronic device 10 in FIG. 1 according to an embodiment of the disclosure. The peripheral area 102 may also include a readout circuit 21, a power supply circuit 22, a reset driver 23, a data driver 24, and a scan driver 25. The readout circuit 21, the power supply circuit 22, and the reset driver 23 can be used to realize the sensing function of the electronic device 10, such as a fingerprint recognition function; the data driver 24 and the scan driver 25 can be used to realize the display function of the electronic device 10.

Figure 4:
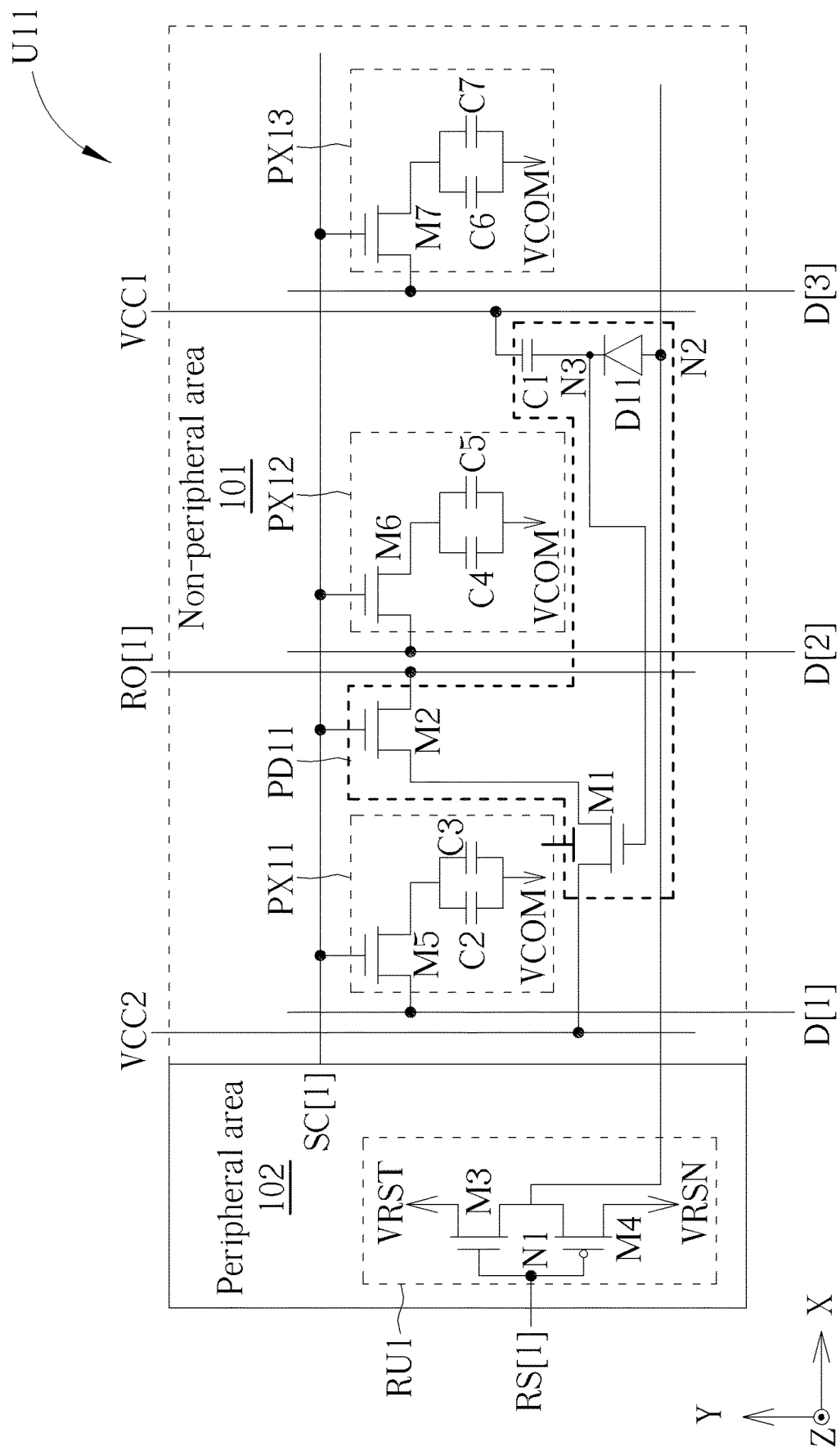
FIG. 4 is an equivalent circuit diagram of an integration unit and a reset unit according to an embodiment of the disclosure.

The power supply circuit 22 is coupled to the sensing units PD11 . . . PD1$n$, PD 21 . . . PD2$n$, PDm1 . . . PDmn, and provides a bias voltage VCC1 and a bias VCC 2 to the sensing units PD11 . . . PD1$n$, PD21 . . . PD2$n$, PDm1 . . . PDmn. The power circuit 22 is coupled to the reset driver 23 for providing a bias voltage VRST and a bias voltage VSEN to the reset driver 23. The power supply circuit 22 is coupled to the pixel units PX11, PX12, and PX13 for providing a bias voltage VCOM to the pixel units PX11, PX12, and PX13 as shown in FIG. 4.

The reset driver 23 is coupled to the sensing units PD11 . . . PD1$n$, PD21 . . . PD2$n$, PDm1 . . . PDmn, for generating them reset signals RS[1] . . . RS[m] to the reset units RU1 . . . RUm shown in FIG. 1, wherein the reset signal RS[1] controls the sensing units PD11 . . . PD1$n$ in the first row to be reset; and so on, the reset signal the RS[m] is input to the reset unit RUm shown in FIG. 1, to control the sensing units PDm1 . . . PDmn in the m-th row to be reset.

The readout circuit 21 is coupled to the sensing units PD11 . . . PD1$n$, PD21 . . . PD2$n$, PDm1 . . . PDmn, for receiving n readout signals RO[1] . . . RO[n], where the x-th readout signal RO[x] is generated by one sensing unit of the m sensing units PD1$x$ . . . PDmx in an x-th column. For example, the read signal RO[1] is generated by a sensing unit of the m sensing units PD11 . . . PDm1 in the first column, and so on, the readout signal RO[n] is generated by a sensing unit of the m sensing units PD1$n$ . . . PDmn in the n-th column.

The data driver 24 is coupled to the pixel units PX11 . . . PX1$p$, PX21 . . . PX2$p$, . . . , PXm1 . . . PXmp for generating p data signals D[1] . . . D[p], wherein the x-th data signal D[x] controls the m pixel units PX1$x$ . . . PXmx in the x-th column. For example, the data signal D[1] controls the m pixel units PX11 . . . PXm1 in the first column, and so on, the data signal D[p] controls the m pixel units PX1$p$ . . . PXmp in the p-th column.

The scan driver 25 is coupled to the sensing units PD11 . . . PD1$n$, PD21 . . . PD2$n$, PDm1 . . . PDmn and the pixel units PX11 . . . PX1$p$, PX21 . . . PX2$p$, PXm1 . . . PXmp for generating m row selecting signals SC[1] . . . SC[m], wherein the y-th row selecting signal SC[y] is used to select the sensing units PDy1 . . . PDyn in the y-th row and the pixel units PX11 . . . PX1$p$ in the y-th row. For example, the row selecting signal SC[1] selects the sensing units PD11 . . . PD1$n$ in the first row and the pixel units PX11 . . . PX1p in the first row, and so on, the row selecting signal SC[m] selects the sensing units PDm1 . . . PDmn in the m-th row and the pixel units PXm1 . . . PXmp in the m-th row. Besides, m, n, p, x, y are positive integers. A scan line for transmitting the y-th row selecting signal SC[y] is coupled to the sensing units PDy1 . . . PDyn in the y-th row and the pixel units PX11 . . . PX1p in the y-th row. For example, a scan line for transmitting the row selecting signal SC[1] is coupled to the sensing units PD11 . . . PD1n in the first row and the pixel units PX11 . . . PX1p in the first row.

Thus, the disclosure is advantageous in that the disclosure may integrate a display function and a fingerprint recognition function in the electronic device 10. By disposing the reset units RU1 . . . RUm in the peripheral area 102 to increase available area of the sensing unit PD and the pixel unit PX in the non-peripheral area 101, the disclosure is further advantageous in increasing fingerprint recognition performance and display performance of the non-peripheral area 101. Another advantage of the disclosure is to reduce the number of stacked layers required to implement the electronic device 10.

Figure 3:
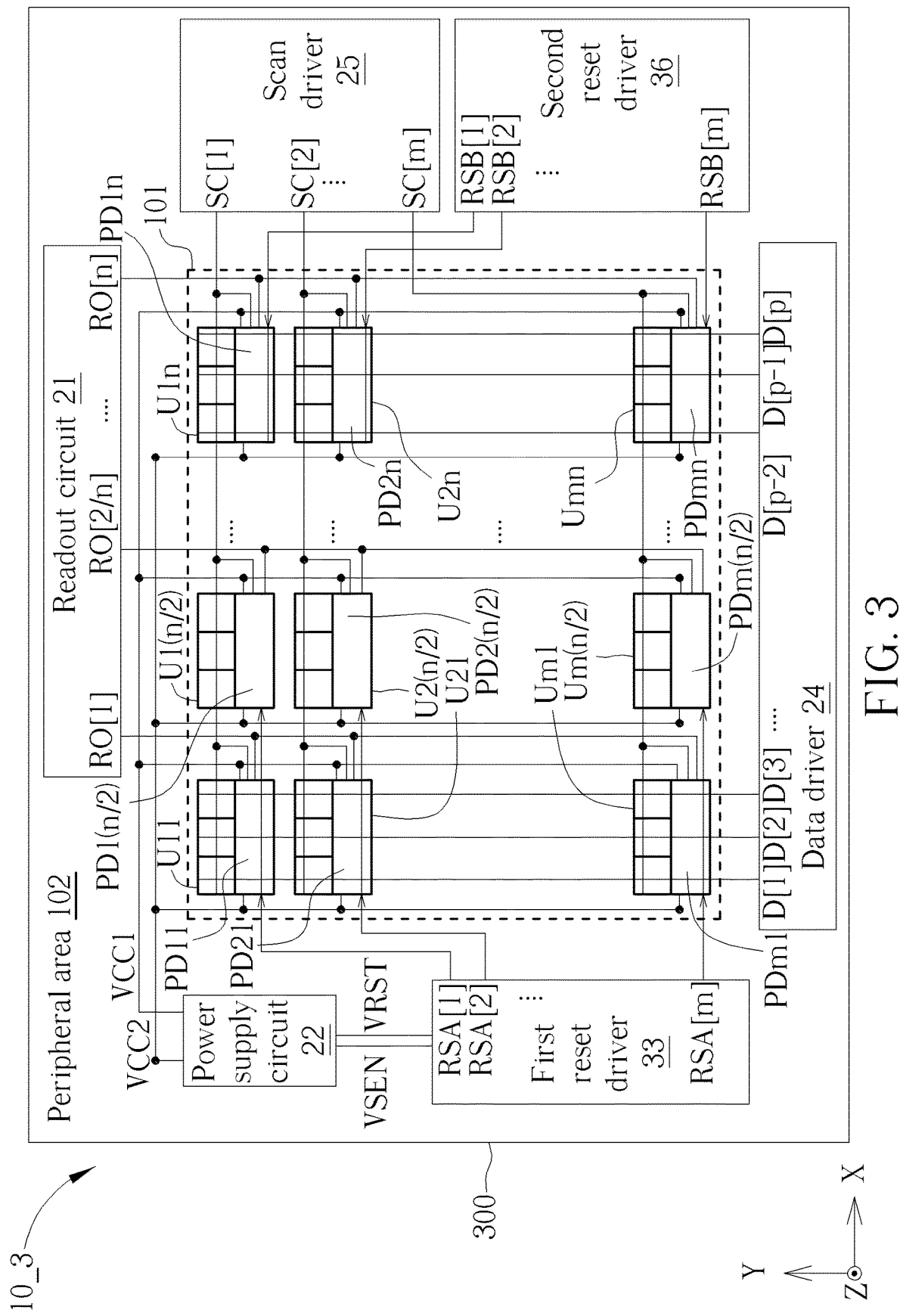
FIG. 3 is a functional block diagram of another electronic device according to an embodiment of the disclosure.

FIG. 3 is a functional block diagram of another electronic device 10_3 according to an embodiment of the disclosure. The circuit design of the electronic device 10_3 and the electronic device 10 are similar, and the same components are denoted by the same symbols. The difference between the electronic device 10_3 and the electronic device 10 is that the electronic device 10_3 includes a reset driver 33 and a reset driver 36, but is not limited thereto. In other embodiments, the electronic device includes at least one reset driver.

A first reset driver 33 generates m reset signals RSA[1] . . . RSA[m], wherein the first reset signal RSA[1] controls the n/2 sensing units PD11 . . . PD1 (n/2) the first row to be reset, and the reset signal RSA[2] controls the n/2 sensing units PD21 . . . PD2 (n/2) in the second row to be reset, and so on, the reset signal RSA[m] controls the n/2 sensing units PDm1 . . . PDm (n/2) in the m-th row to be reset. The second reset driver 36 generates m reset signals RSB[1] . . . RSB[m], wherein the reset signal the RSB[1] controls the n/2 sensing units PD1 (n/2+1) . . . PD1n the first row to be reset, and the reset signal RSB[2] controls the n/2 sensing units PD2 (n/2+1) . . . PD2n in the second row to be reset, and so on, the reset signal RSB[m] controls the n/2 sensing units PDm (n/2+1) . . . PDmn in the m-th row to be reset, but it is not limited to this. In other words, the reset driver 33 in one side controls sensing units located in odd rows of the non-peripheral area 101, and the reset driver 36 in another side controls sensing units located in even rows of the non-peripheral area 101, but not limited to this. Those skilled in the art can arbitrarily divide the non-peripheral area 101 into different areas according to application requirements, and use different reset drivers to control the sensing units in different areas to reset.

FIG. 4 is an equivalent circuit diagram of the integration unit U11 and the reset unit RU1 according to an embodiment of the disclosure. The embodiments of FIG. 4 to FIG. 12 can be used to realize non-self-luminous display. The reset unit RU1 includes a transistor M3 and a transistor M4 connected in series with each other, and includes a node N1 disposed in the peripheral area 102 and a node N2 disposed in the non-peripheral area 101. The reset unit RU1 is coupled to the reset driver 23 (not shown) via the node N1 to receive the reset control signal RS[1]. The transistor M3 includes a control terminal, a first terminal and a second terminal. In the present disclosure, the first terminal and the second terminal can be a drain and a source of a thin film transistor, respectively, or can be a source and a drain of a thin film transistor, respectively. The control terminal of the transistor M3 is coupled to the reset driver 23 via the node N1, the first terminal of the transistor M3 is coupled to the bias voltage VRST, and the second terminal of the transistor M3 is coupled to the node N2. The transistor M4 includes a control terminal, a first terminal and a second terminal. The control terminal of the transistor M4 is coupled to the reset driver 23 via the first node N1, the first terminal of the transistor M4 is coupled to the node N2, and the second terminal of the transistor M4 is coupled to the bias voltage VSEN.

The integration unit U11 includes the sensing unit PD11, pixel units PX11, PX12, PX13. The sensing unit PD11 includes a capacitor C1, a transistor M1, a transistor M2, and a sensing photodiode D11. The sensing photodiode D11 includes a first terminal and a second terminal. The first terminal of the sensing photodiode D11 is coupled to the node N2. The first terminal of the sensing photodiode D11 may be an anode, the second terminal of the sensing photodiode D11 may be a cathode, but is not limited thereto. The capacitor C 1 includes a first terminal and a second terminal. The first terminal of the capacitor C 1 is coupled to the second terminal of the sensing photodiode D via a node N3, and the second terminal of the capacitor C 1 is coupled to the bias voltage VCC1. The transistor M1 includes a control terminal, a first terminal and a second terminal. The control terminal of the transistor M1 is coupled to the node N3, and the first terminal of the transistor M1 is coupled to the bias voltage VCC2. The transistor M2 includes a control terminal, a first terminal, and a second terminal. The control terminal of the transistor M2 is coupled to the scan driver 25 to receive the row selecting signal SC[1], and the first terminal of the transistor M2 is coupled to the second terminal of the transistor M1. The second terminal of the transistor M2 is coupled to the readout circuit 21 to output the readout signal RO[1].

The transistors M1, M2, M3 may be an N-type metal oxide semiconductor (NMOS) transistor, the transistor M4 may be a P-type metal oxide semiconductor (PMOS) transistor, but it is not limited to this. The transistor M1 can amplify a reverse bias current (sensing current) of the sensing photodiode D11, the transistor M2 can select the output signal RO[1] to be read, the transistor M3 can discharge the capacitor C1 to reset the voltage of the node N3, and the transistor M4 can set the voltage of the node N2 to the bias voltage VSEN so that the sensing photodiode D11 is in a reverse bias state. In this embodiment, since the transistors M1 requires a high transconductance (Gm) to convert a small input voltage into a large output, the transistor M1 may include a double gate structure, to improve sensing performance of the transistor M1. In this embodiment, the double gate structure may be, for example, different conductive layers located in opposite upper and lower sides of the same semiconductor layer to control the corresponding semiconductor layer.

The pixel unit PX11 is corresponding to the transistor M5 and the capacitors C2 and C3 connected in parallel with each other. The pixel unit PX12 is corresponding to the transistors M6 and capacitors C4, C5 connected in parallel with each other. The pixel unit PX13 is corresponding to the transistors M7 and capacitors C6, C7 connected in parallel with each other.

The structure of the pixel unit PX11, the pixel unit PX12 and the pixel unit PX13 may be the same. In this embodiment, the pixel unit PX11 is taken as an example, and the structure of the pixel unit PX12 and the pixel unit PX13 can be deduced by analogy. The transistor M5 includes a control terminal, a first terminal and a second terminal. The control terminal of the transistor M5 is coupled to the scan driver 25 to receive the row selecting signal SC[1], and the first terminal of the transistor M5 is coupled to the data driver 24 to receive the data signal D[1], and the second terminal of the transistor M5 is coupled to the first terminals of the capacitors C2 and C3, the second terminal of the capacitor C2 is coupled to the bias voltage VCOM, and the second terminal of the capacitor C3 is coupled to the bias voltage VCOM. The operations of the pixel units PX11, PX12 and PX13 are well known to those skilled in the art, and will not be narrated here.

In the disclosure, the sensing unit PD11 and the at least one pixel unit (e.g., the unit pixels PX11, PX12, the PX13) in the non-peripheral area 101 are coupled to the same row selecting signal SC[1], to use the same scan timing. In one embodiment, the plurality of integration units U11 ... U1n in the non-peripheral area 101 can be connected to the same reset unit RU1. In this way, the disclosure can achieve integration and simplify the circuit configuration of the electronic device 10 without affecting the fingerprint sensing function.

Figure 5:
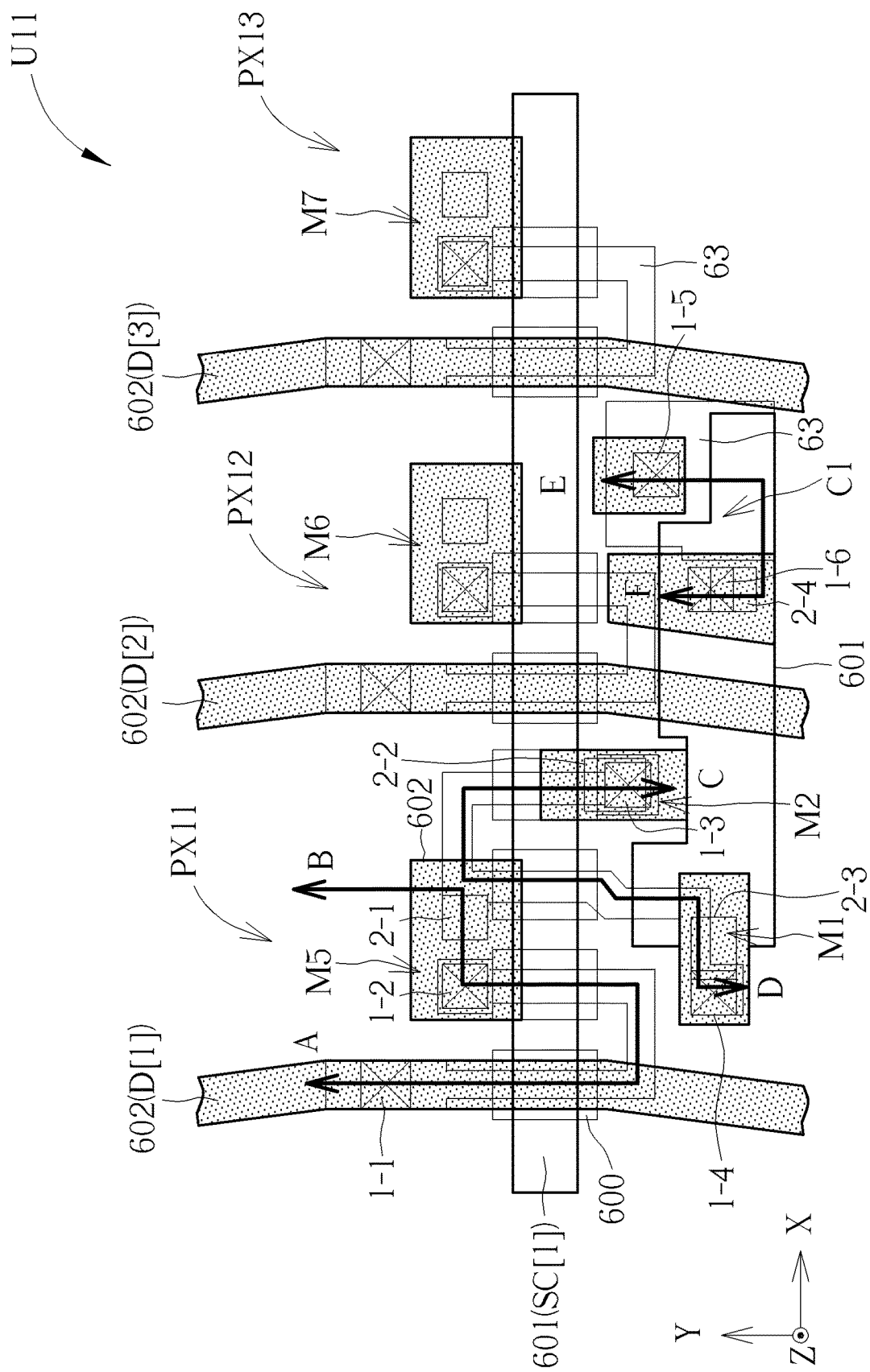
FIG. 5 is a top view of a structure design of the integration unit according to an embodiment of the disclosure.
Figure 6:
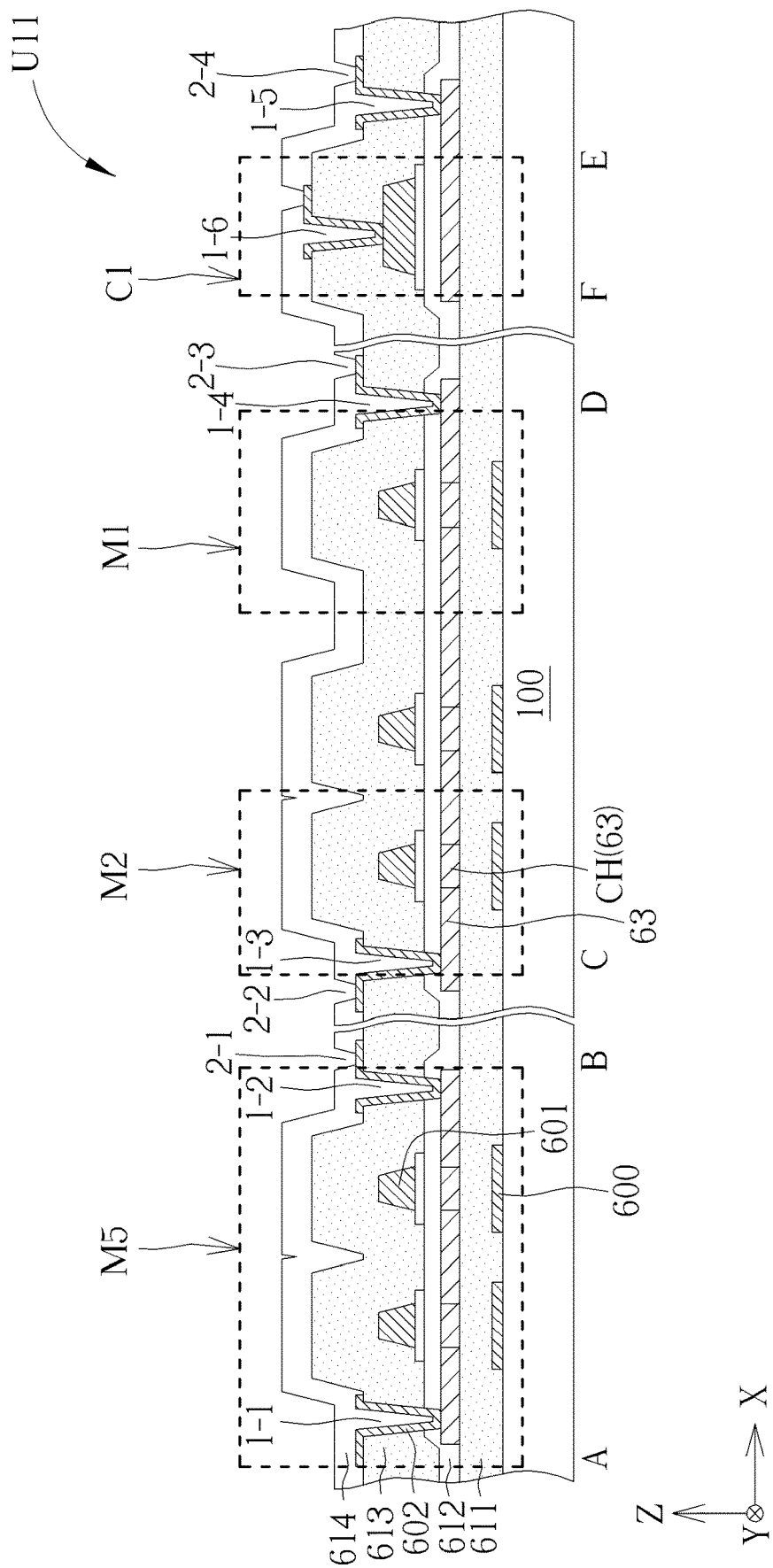
FIG. 6 is a cross-sectional view of a structure design of the integration unit shown in FIG. 5 according to an embodiment of the disclosure.

FIG. 5 is a top view of a structure design of the integration unit U11 according to an embodiment of the disclosure. FIG. 6 is a cross-sectional view of a structure design of the integration unit U11 shown in FIG. 5 according to an embodiment of the disclosure, wherein FIG. 5 is corresponding to FIG. 6, and FIG. 5, FIG. 6 are semi-finished devices of the electronic device 10. In FIG. 5 and FIG. 6, a point A to a point B passes through the transistor M5 and the wire transferring the bias voltage VCC2; a point C to a point D passes through the transistors M2 and M1; a point E to a point F passes through the capacitor C1. FIG. 5 to FIG. 12 are corresponding to the equivalent circuit diagrams of FIG. 4, and can be utilized for implementing non-luminous display functions.

In FIG. 6, an conductive layer 600 is disposed on the substrate 100, an insulating layer 611 is disposed on the conductive layer 600, a semiconductor layer 63 is disposed on the insulating layer 611, an insulating layer 612 is disposed on a semiconductor layer 63, and the conductive layer 601 is disposed on the insulating layer 612. An insulating layer 613 is on the conductive layer 601, the conductive layer 602 is disposed on the insulating layer 613, and the conductive layer 602 can be electrically connected to the semiconductor layer 63. The semiconductor layer 63 is corresponding to a part of a channel area CH of the conductive layer 601.

In the transistor M5, openings 1-1 and 1-2 penetrate through the insulating layer 613 and the insulating layer 612 (i.e. the transistor M5 includes the openings 1-1 and 1-2), so that the conductive layer 602 is electrically connected to the semiconductor layer 63 through the openings 1-1 and 1-2. In other words, when an opening penetrate through an insulating layer means the insulating layer includes the opening in the present embodiment. In the transistor M2, an opening 1-3 penetrates through the insulating layer 613 and the insulating layer 612, so that the conductive layer 602 is electrically connected to the semiconductor layer 63 through the opening 1-3. In the transistor M1, an opening 1-4 penetrates through the insulating layer 613 and the insulating layer 612, so that the conductive layer 602 is electrically connected to the semiconductor layer 63 through the opening 1-4. An opening 1-6 penetrates through the insulating layer 613, so that the conductive layer 602 is electrically connected to the conductive layer 601 and the sensing photodiode D11 through the opening 1-6. An opening 1-5 penetrates through the insulating layers 613 and 612, so that the conductive layer 602 is electrically connected to the semiconductor layer 63 through the openings 1-5, to transmit the bias voltage VCC1 to the semiconductor layer 63. In this embodiment, the capacitor C1 can be formed by the conductive layer 601 and the semiconductor layer 63 that receive different signals.

Regions of transistors M1, M2, M5 are, for example, dashed boxes as shown in FIG. 6, and each transistor includes a semiconductor layer 63, corresponding stacked layers (e.g., the conductive layer 601 and the conductive layer 602). The dashed boxes in FIG. 6 are only an example, but not limited thereto.

In one embodiment, the transistor M1 may optionally include the conductive layer 600, has a double gate structure, and includes a control terminal G1 and a control terminal G2. In the present embodiment, the double gate structure may be, for example, different conductive layers (e.g., the conductive layers 600, 601) located in opposite upper and lower sides of the same semiconductor layer to control the corresponding semiconductor layer. By inputting a bias to the control terminal G2, a transconductance (Gm) of the transistor M1 is adjusted, so that the transistor M1 may convert sensing current of the sensing photodiode D11 into a larger current according to different voltage changes. Therefore, the disclosure improves operating characteristics of the transistor M1 (for example, amplifying the sensing current of the sensing photodiode), to improve operating performance of the sensing unit PD11.

The insulating layer 614 is disposed on the conductive layer 602 and includes openings 2-1, 2-2, 2-3, and 2-4 to expose at least of a part of the conductive layer 602. In the present embodiment, the insulating layer 611, 612, 613, 614 (or insulating layers and substrates in other embodiments of the disclosure) may be a single layer structure or multilayer structure, but is not limited thereto. The materials for the substrate, the semiconductor layer, the insulating layer and the conductive layer in the present embodiment or other embodiments of the disclosure are illustrated in the following table as an example, but not limited thereto.

TABLE

| | |
|---|---|
| Substrate (e.g. for supporting) | Polyimide (PI), polyethylene terephthalate (PET), polycarbonate (PC), polyethersulfone (PES), polybutylene terephthalate (PBT), polynaphthalene Ethylene formate (PEN) or polyarylate (PAR), other suitable materials or combinations thereof. |
| Semiconductor layer | The material of the semiconductor layer may include, but is not limited to, Si (amorphous, polycrystalline, single crystal), Ge, compound semiconductors (e.g., gallium nitride, silicon carbide, gallium arsenide, gallium phosphide, indium phosphide, indium arsenide, and/or indium antimonide), alloy semiconductor (such as SiGe alloy, GaAsP alloy, AlInAs alloy, AlGaAs alloy, GaInAs alloy, GaInP alloy, GaInAsP alloy), or a combination of the foregoing. The material of the semiconductor layer may also include, but is not limited to, metal oxides, such as indium gallium zinc oxide (IGZO), indium zinc oxide (IZO), indium gallium zinc oxide (IGZTO), or organic semiconductor including polycyclic aromatic compounds, or a combination of the foregoing. In some embodiments, the semiconductor layer may be doped with p-type or n-type dopants. Different TFTs in this disclosure may use a single semiconductor material or a mixture of different semiconductor materials. |

TABLE-continued

| | |
|---|---|
| Insulation layer | Inorganic material such as silicon nitride, silicon oxide, silicon oxynitride, alumina ($Al_2O_3$) and hafnium oxide ($HfO_2$), organic material such as acrylic resin or other suitable dielectric materials. |
| Conductive layer | Opaque conductive material may be, for example, metal oxide or other suitable conductive materials. For example, the material may respectively include at least one of aluminum, copper, silver, chromium, titanium, molybdenum, or an alloy or a combination of the above materials. Transparent conductive material may be, for example, a transparent conductive oxide (TCO), such as an ITO (Indium tin oxide) or an IZO (Indium Doped Zinc Oxide) or a combination of the above materials. Translucent conductive material may be, for example, a metal thin film, such as a magnesium-silver alloy thin film, a gold thin film, a platinum thin film, and an aluminum thin film, etc, or a combination of the above materials. Conductive layer may be a single-layer or multilayer composite structure including metal. Conductive material may be a combination of the above materials. |

Please refer back to FIG. 5, the transistor M1 and the transistor M2 of the sensing unit PD11 are disposed adjacent to the pixel unit PX11 (e.g. the transistor M5), the capacitor C1 of the sensing unit PD11 is disposed adjacent to the second pixel unit PX12 (e.g. the transistors M6), and the sensing photodiode D11 of the sensing unit PD11 is disposed adjacent to the pixel unit PX13 (e.g. the transistor M7). Those skilled in the art can appropriately arrange design of the transistors M1, M2, the capacitor C1 and the sensing photodiode D11, which is not limited to the embodiment of the disclosure.

The conductive layer 601 receives the row selecting signal SC[1], and the conductive layer 602 receives the data signal D[1], the data signal D[2] and the data signal D[3], wherein the data signal D[1] is corresponding to the transistor M5, the data signal D[2] is corresponding to the transistor M6, and the data signal D[3] is corresponding to the transistor M7. In the non-peripheral area 101, the transistor M1 and the transistor M2 of the sensing unit PD11 are corresponding to the pixel unit PX11 and between the data signal D[1] and the data signal D[2]. The capacitor C1 of the sensing unit PD11 is corresponding to the pixel unit PX12 and between the data signal D[2] and the data signal D[3]. The sensing photodiode D11 of the sensing unit PD11 may be corresponding to at least one of the pixel units PX11, PX12 or PX13 or the three unit pixels PX11, PX12 and PX13, but is not limited thereto.

Figure 7:
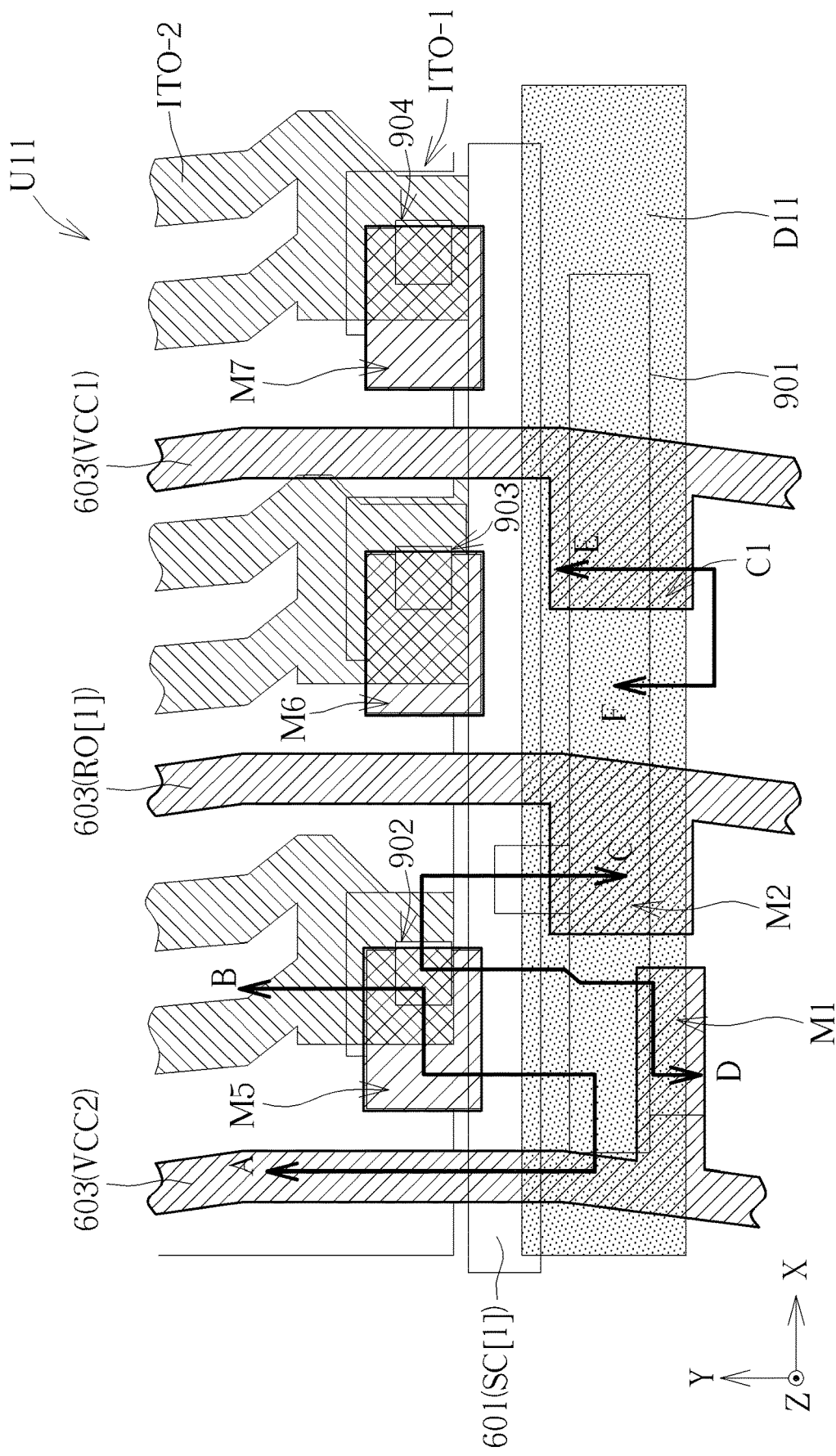
FIG. 7 is a top view of the structure design of a sensing photodiode of the integration unit according to the embodiment of the disclosure.
Figure 8:
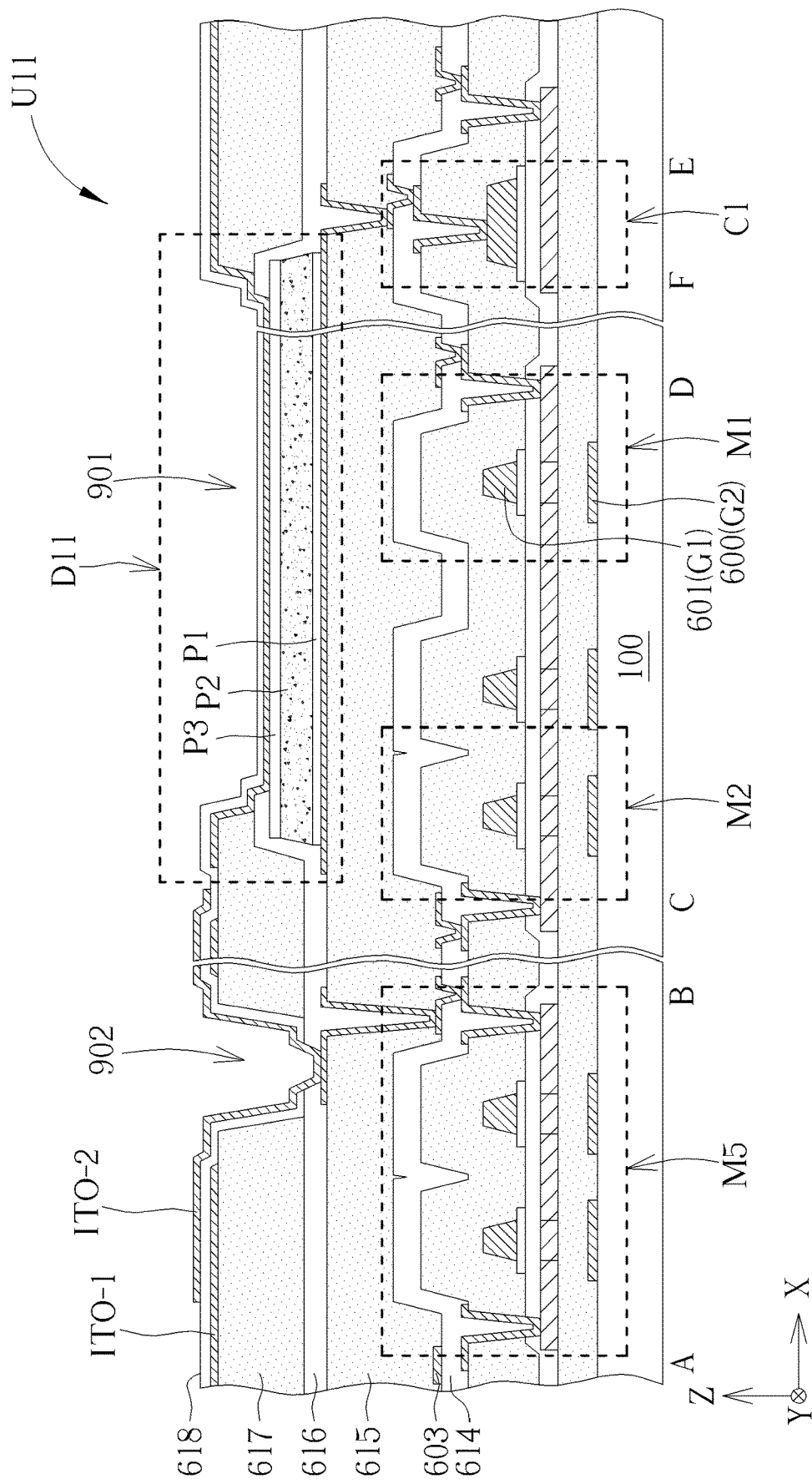
FIG. 8 is a cross-sectional view of the structure design of the integration unit shown in FIG. 7 according to the embodiment of the disclosure.

FIG. 7 is atop view of a structural design of the integration unit U11 according to the embodiment of the disclosure. FIG. 8 is a cross-sectional view of the structure design of the integration unit U11 shown in FIG. 7 according to the embodiment of the disclosure, wherein FIG. 7 is corresponding to FIG. 8, and the electronic devices 10 of FIG. 7, FIG. 8 are semi-finished devices following FIG. 5, FIG. 6.

In FIG. 8, the conductive layer 603 is disposed on the insulating layer 614, the insulating layer 615 is disposed on the conductive layer 603, the conductive layer 604 is disposed on the insulating layer 615, the sensing photodiode D11 is disposed on the conductive layer 604, and the insulating layer 616 is disposed on the sensing photodiode D11 and the conductive layer 604, and the insulating layer 617 is disposed on the insulating layer 616.

In the insulating layer 616 and the insulating layer 617, at least of a part of the sensing photodiode D11 is exposed (for example, an opening 901 penetrates the insulating layer 616 and the insulating layer 617), and/or at least of a part of the conductive layer of the sensing photodiode D11 is exposed (for example, an opening 902 penetrates the insulating layer 616 and the insulating layer 617). An conductive layer ITO-1 is disposed on the insulating layer 617, the insulating layer 618 is disposed on the conductive layer ITO-1. An conductive layer ITO-2 is disposed on the insulating layer 618. The insulating layer 618 can make the conductive layer ITO-2 and the conductive layer ITO-1 electrical insulated, wherein the conductive layer ITO-2 may partially overlap the conductive layer ITO-2. In this embodiment, the insulating layer 615 and the insulating layer 617 have a flattening function (for example, following components (e.g. the sensing photodiode D11) may be formed on a flat surface).

The sensing photodiode D11 may include a semiconductor layer P1, an intrinsic semiconductor layer P2 and a semiconductor layer P3 disposed along a direction perpendicular to the substrate 100 (e.g. the direction of the Z), wherein the intrinsic semiconductor layer P2 may be interposed between the semiconductor layer P1 and the semiconductor layers P3. In the present embodiment, the conductive layer ITO-1 may be electrically connected with the sensing photodiode D11 (e.g. the semiconductor layer P3) through the opening 901, and the conductive layer ITO-2 may be electrically connected with the transistor M5 (e.g. the conductive layer 604) through the opening 902.

By disposing the sensing photodiode D11 of the integration unit U11 on the insulating layer 615, the sensing photodiode D11 may be overlapped with at least a part of the transistor M2, at least a part of the transistors M1 and at least a part of the capacitor C1 of the integration unit U11, to increase the area of the sensing photodiode D11, thereby improving the characteristic performance of the sensing photodiode D11.

Please return to FIG. 7, it is worth noting that the conductive layer 604 is not shown in FIG. 7. Furthermore, the conductive layer 603 can respectively receive the bias VCC2, the read signal RO[1] and the bias VCC1, and the conductive layer 603 may be overlapped with at least a part of the conductive layer 602.

Figure 9:
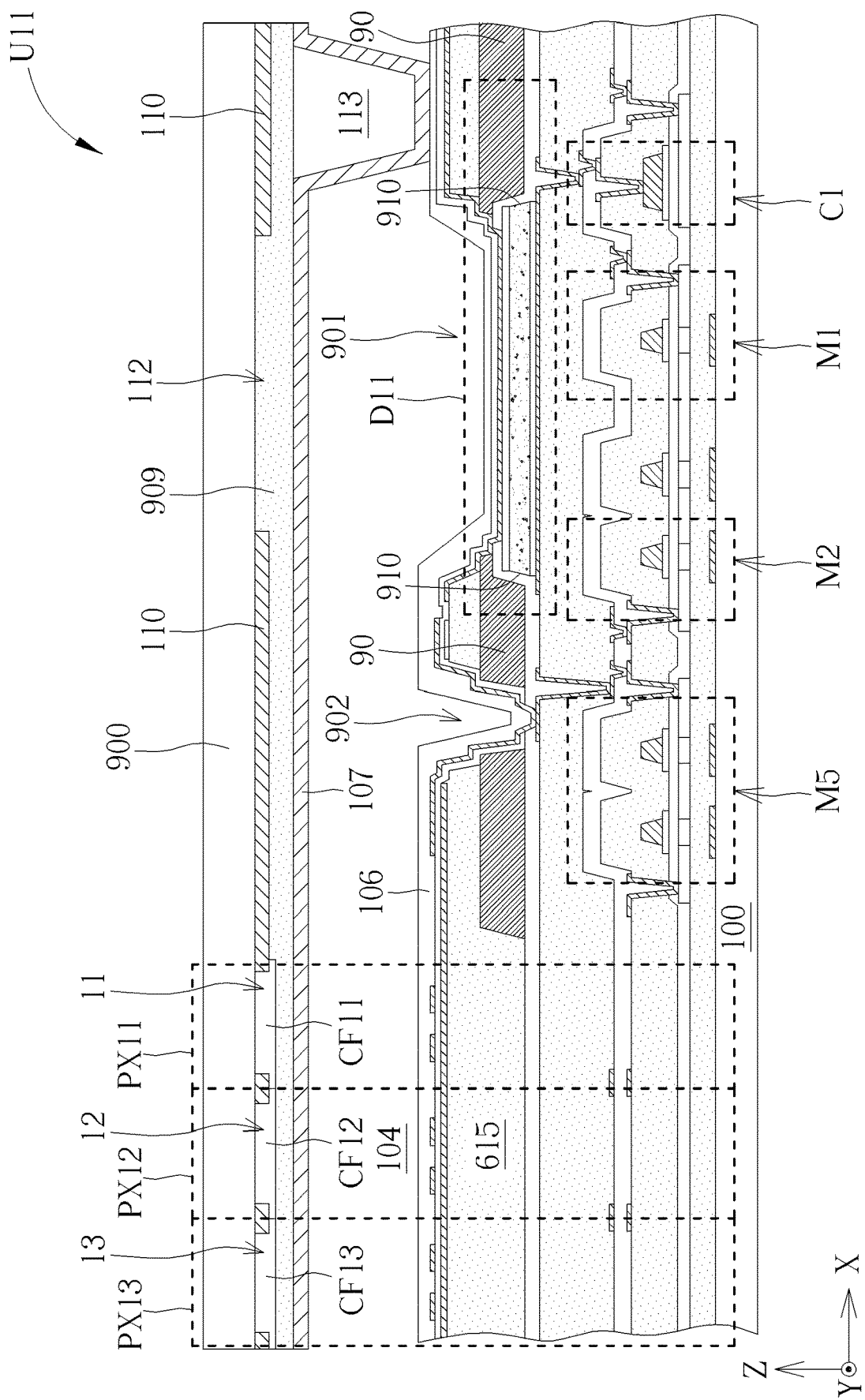
FIG. 9 is a cross-sectional view of a structure design of the integration unit according to an embodiment of the disclosure.

FIG. 9 is a cross-sectional view of a structure design of the electronic device 10 according to an embodiment of the disclosure, and FIG. 9 is a finished device of the electronic device 10 following FIG. 8. The electronic device 10 of FIG. 9 may be, for example, a liquid crystal (LC) display panel. The electronic device 10 further includes another substrate 900. In this embodiment, a light shielding structure 110, a light filter structure CF11, a light filter structure CF12, a light filter structure CF13, an insulating layer 909, a supporting element 113, and an alignment layer 107 are sequentially disposed on the another substrate 900. The filter structures CF11, CF12, and CF13 can be color filter layers, which convert colors to be corresponding to different colors. The light shielding structure 110 includes an opening 112, an opening 11, an opening 12, and an opening 13. The opening 112 is corresponding to the opening 901 and the sensing photodiode D11 (in other words, the opening 112 is at least partially overlapped with the opening 901 and the sensing photodiode D11), the opening 11 is corresponding to the filter structure CF11, the opening 12 is corresponding to the filter structure CF12, and the opening 13 is corresponding to the filter structure CF13. In other embodiments, the color filter layers may be disposed on the substrate 100. The alignment layer 106 is disposed on the sensing photodiode D11. A display medium layer 104 is disposed between the substrate 100 and the another substrate 900. Material of the display medium layer 104 may be a liquid crystal (LC).

It is worth noting that, in this embodiment, a light shielding structure 90 can be optionally included. The light shielding structure 90 is disposed on the substrate 100, and adjacent to the sensing photodiode D11, and the sides 910 of the sensing photodiode D11 is surrounded by the light shielding structure 90, to expose at least of at least a part of the sensing photodiode D11 via the opening 901.

By the way, effects of other scattering lights on the sensing photodiode D11 can be reduced, to improve characteristic performance of the sensing photodiode D11, such as improving quantum efficiency of light sensor increasing signal to noise ratio (SNR), thereby obtaining a sharp fingerprint imaging. The material of the light shielding structure 90 may be, for example, a light absorbing material, black resin or black ink, but is not limited thereto.

Figure 10:
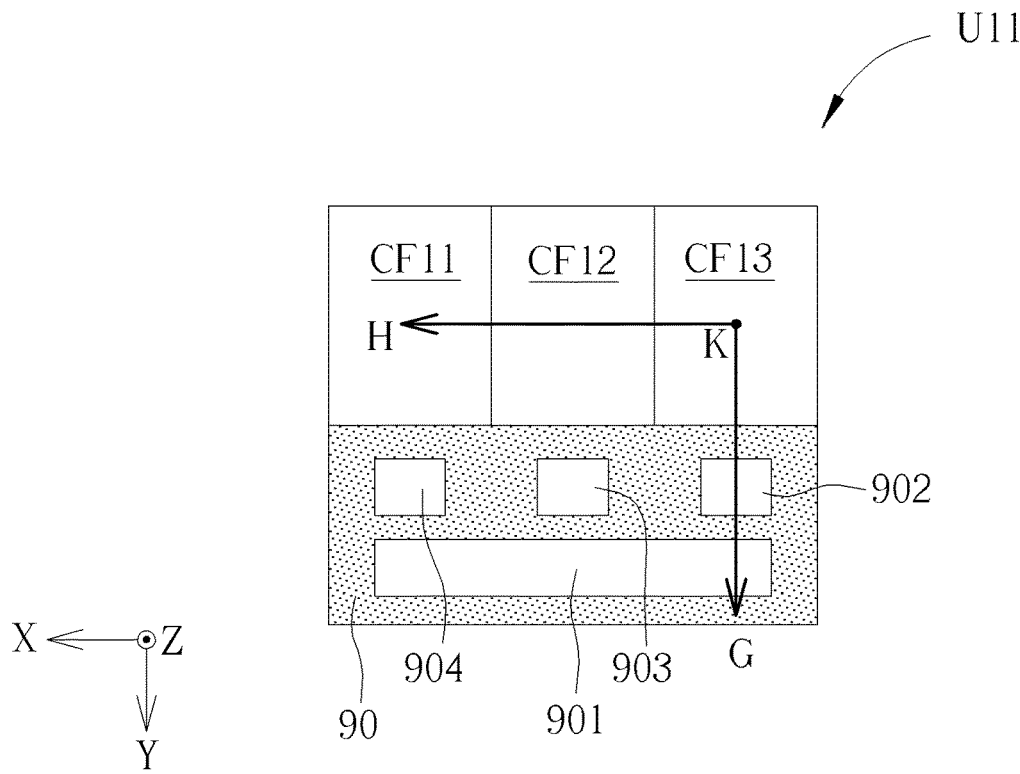
FIG. 10 is a simple schematic diagram of the integration unit according to an embodiment of the disclosure.
Figure 11:
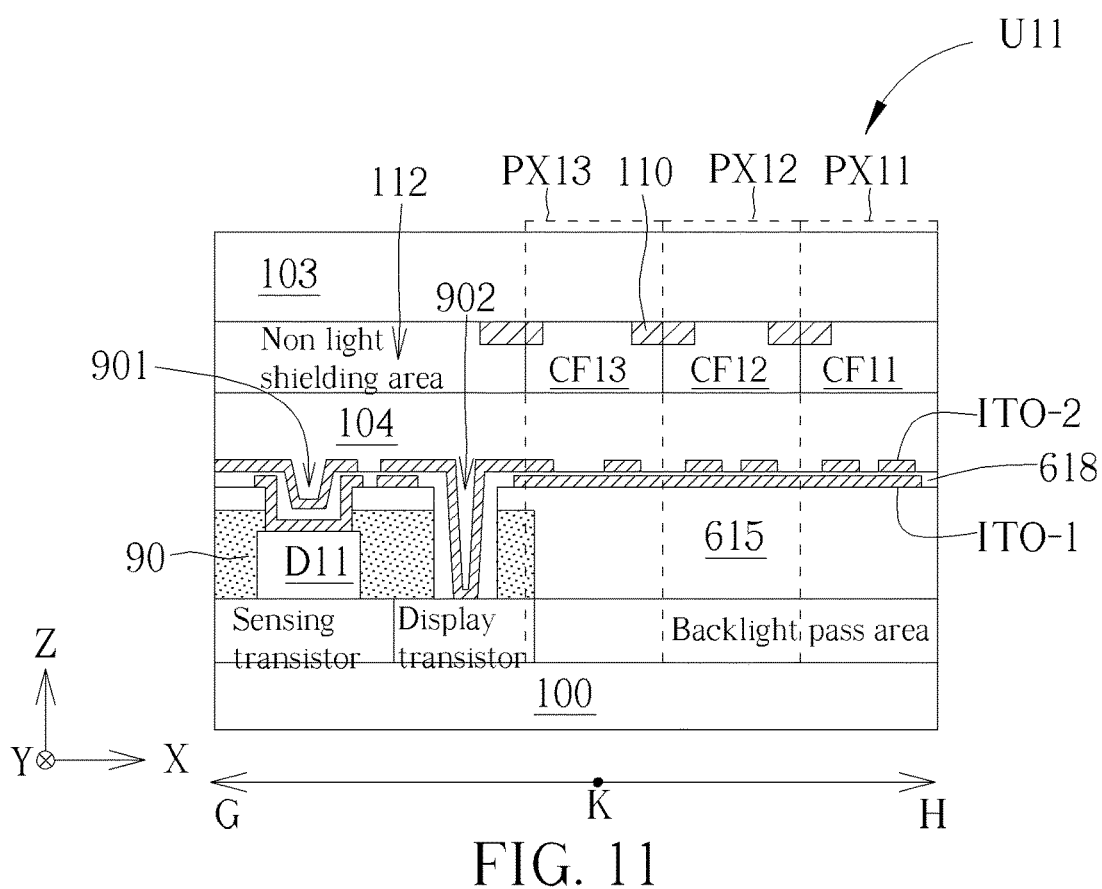
FIG. 11 is a cross-sectional view of a structure design of the integration unit according to an embodiment of the disclosure.

FIG. 10 is a simple schematic diagram of the integration unit U11 according to an embodiment of the disclosure. FIG. 11 is across-sectional view of the integration unit U11. In the present embodiment, the backlight pass area may be corresponding to the filter structures CF11, CF12, CF13, and light may pass through the substrate 100 to the cover layer 103. The non light shielding area may be corresponding to the opening 112, and light may pass to be sensed by the sensing photodiode D11. The integration unit U11 can be used in the electronic device U11 of FIG. 9. A point G, a point K to a point H pass through the sensing photodiode D11, the pixel units PX13, PX12 and PX11. Openings 901, 902, 903, and 904 penetrate through the light shielding structure 90. From the point G to the point K, the opening 901 exposes at least of a part of the sensing photodiode D11 and a sensing transistor (e.g. the transistor M1, the transistor M2 of the sensing unit PD11), the opening 902 exposes at least of a part of a display transistor (e.g., the transistor M7 of the pixel unit PX13, not shown in FIG. 11), but is not limited thereto. The pixel units PX13, PX12 and PX11 are corresponding to a backlight pass area. The structure design of FIG. 9 can be applied to FIG. 10, and thus the structure design of FIG. 10 is not described herein.

Figure 12:
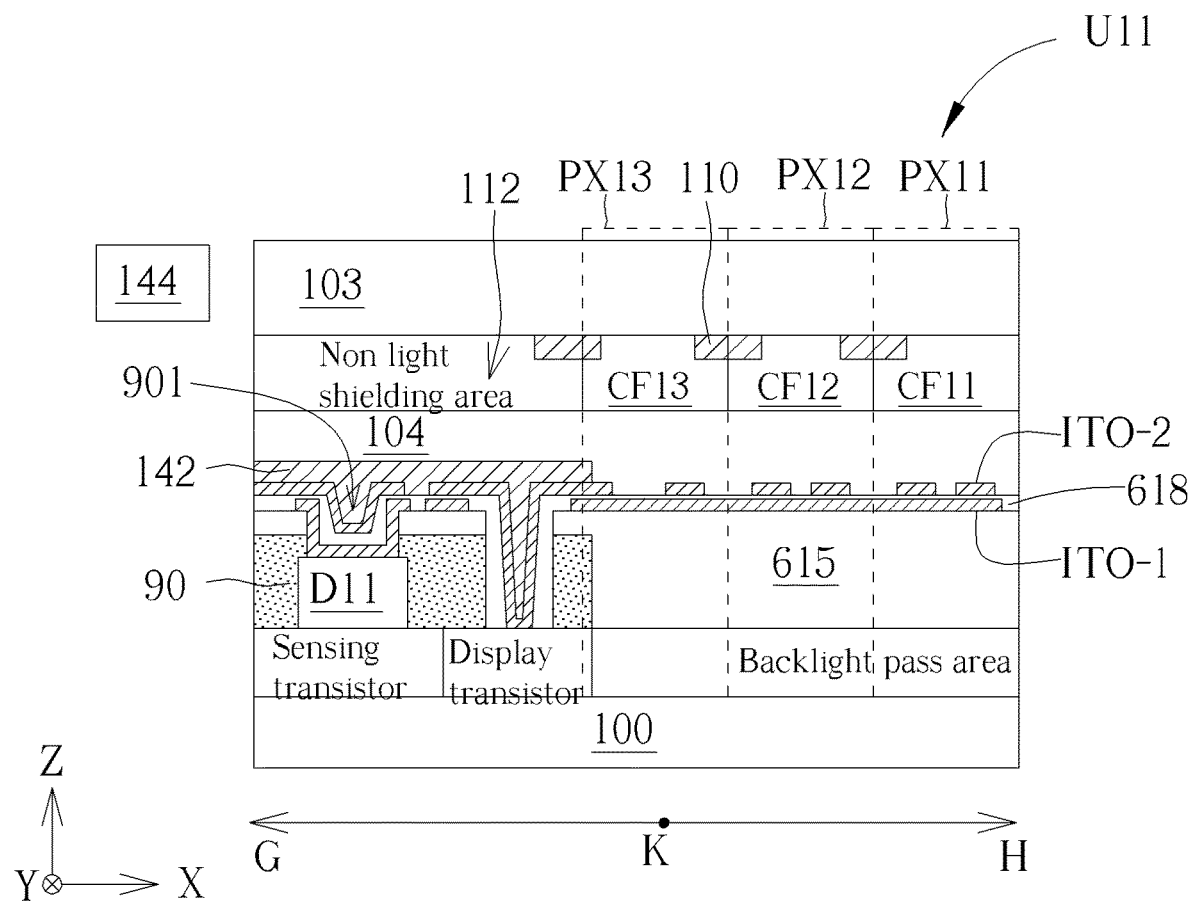
FIG. 12 is a cross-sectional view of a structure design of the integration unit according to an embodiment of the disclosure.

FIG. 12 is a cross sectional view of the integration unit U11 according to an embodiment of the disclosure. The integration unit U11 further optionally includes a light shielding structure 142. The light shielding structure 142 is disposed on the sensing photodiode D11, and/or may be disposed in the opening 901, to cover the part of the sensing photodiode D11 exposed by the opening 901. In addition, the light shielding structure 142 can selectively allow specific light to pass through. The integration unit U11 may include a light source 144, and the light source 144 illuminates fingerprints. In this embodiment, the light shielding structure 142 may be made of infrared pass material, and the light source 144 is an infrared light source. When the light source 144 emits incident light, the light shielding structure 142 allows the incident light to pass through, and shields other non-infrared light, so that the sensing photodiode D11 can sense the incident light, reduce noise, and increase the ratio of correctly received signals. In this embodiment, the light shielding structure 90 can also selectively allow specific light to pass through, and the light shielding structure 90 is made of, for example, an infrared pass material.

Figure 13:
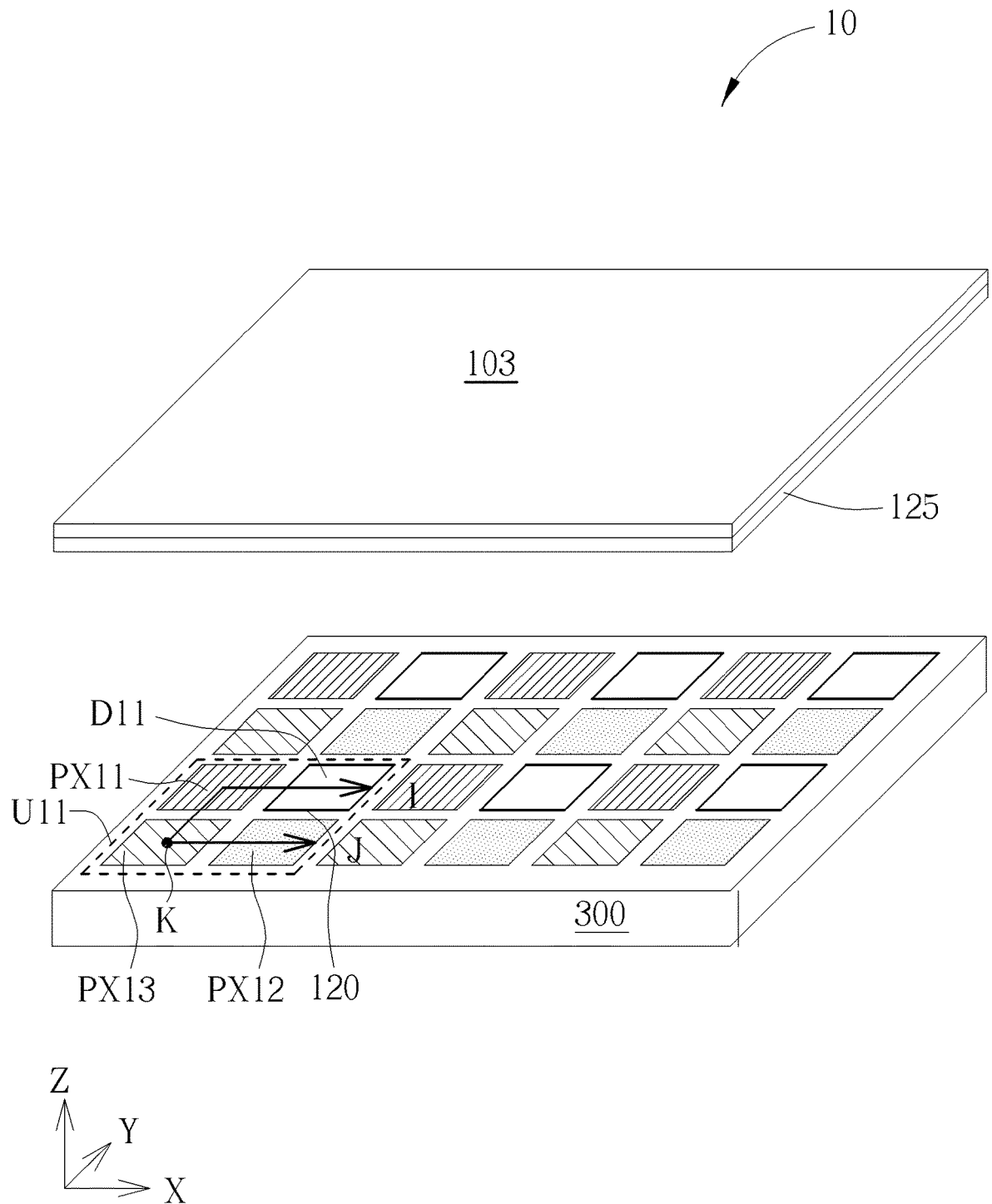
FIG. 13 is a simple schematic diagram of an electronic device according to an embodiment of the disclosure.

FIG. 13 is a simplified schematic diagram of the integration unit U11 according to an embodiment of the disclosure.

Figure 14:
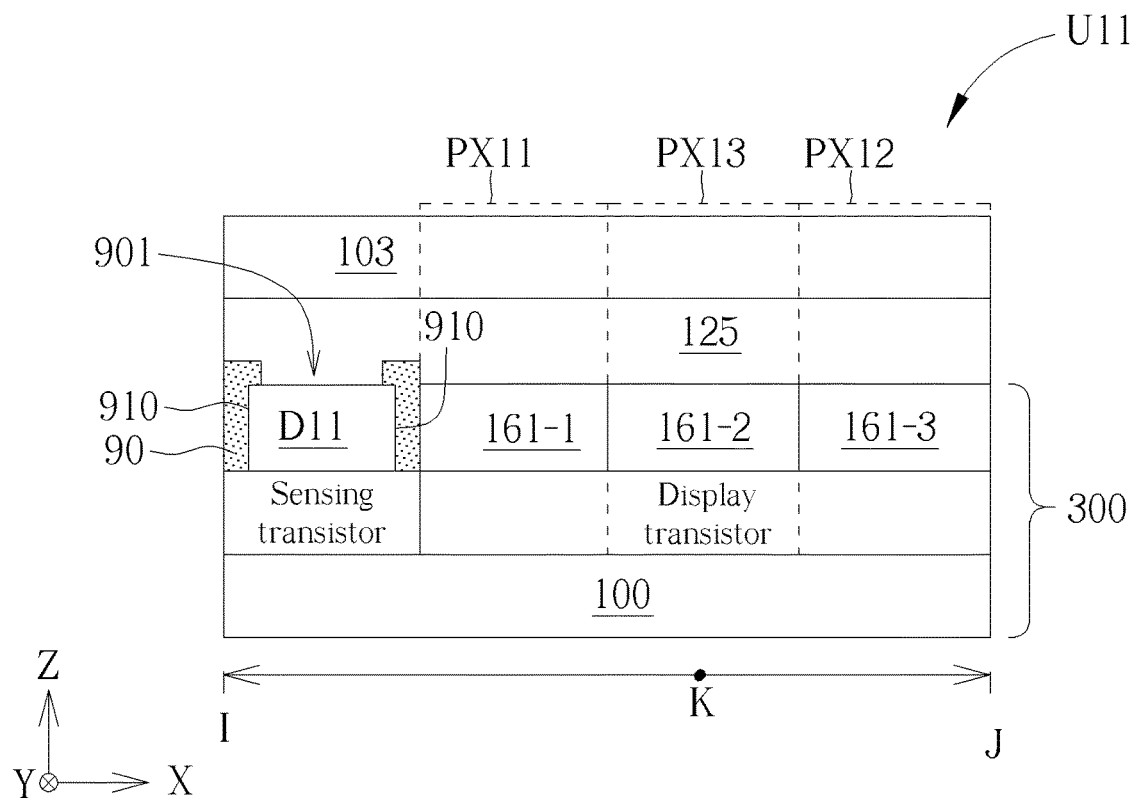
FIG. 14 is a cross-sectional view of a structure design of the integration unit according to an embodiment of the disclosure.

Embodiments of FIG. 13 to FIG. 17 may realize self-luminous display. FIG. 14 is a cross sectional view of the integration unit U11 according to an embodiment of the disclosure. In FIG. 13 and FIG. 14, point I to K to J passes through the sensing photodiode D11, the pixel units PX11, PX13 and PX12. A cover layer 103 is disposed on the substrate 300 (e.g. for protection), the package layer 125 is disposed between the substrate 300 and the cover layer 103. As shown in FIG. 14, the substrate 300 may include structures such as the substrate 100, the sensing photodiode D11, sense transistors (e.g. the transistors M1, M2 in FIG. 17), display transistors (e.g., transistors M8, M9, M10, M11, M12, M13 in FIG. 17). A light shielding structure 90 is adjacent to the sensing photodiode D11, (wherein the sides 910 of the sensing photodiode D11 is surrounded by the light shielding structure 90) and exposes at least of a part of the sensing photodiode D11, to reduce effects of other scattering lights on the sensing photodiode D11, thereby improving characteristic performance of the sensing photodiode D11.

Equivalent circuit designs of display transistors corresponding to the pixel units PX11, PX13 and PX12 in FIG. 13, FIG. 14 are different from the embodiment in FIG. 4, and will be described in FIG. 17 later. It is worth noting that, in this embodiment, display medium layers 161-1, 161-2, and 161-3 are disposed on the substrate 100, the pixel unit PX11 is corresponding to the display medium layer 161-1, and the pixel unit PX12 is corresponding to the display medium layer 161-2, the pixel unit PX13 is corresponding to the display medium layer 161-3, and the display medium layers 161-1, 161-2, and 161-3 can be respectively corresponding to different display transistors. In this embodiment, the display medium layer may be, for example, an organic light emitting layer.

Figure 15:
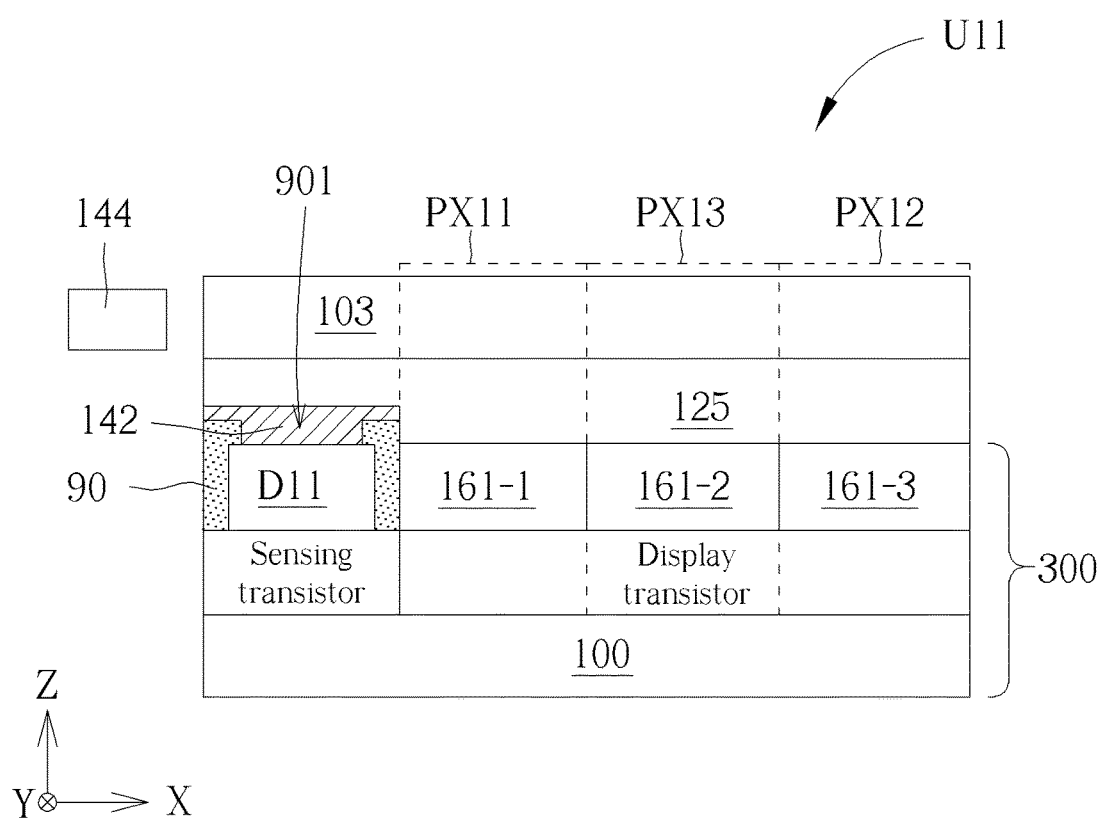
FIG. 15 is a cross-sectional view of a structure design of the integration unit according to an embodiment of the disclosure.

FIG. 15 is a cross sectional view of the integration unit U11 according to an embodiment of the disclosure. The integration unit U11 includes a light shielding structure 142 and an light source 144. The light shielding structure 142 is disposed on the sensing photodiode D11, and/or may be disposed in the opening 901, to cover the part of the sensing photodiode D11 exposed by the opening 901, wherein the light shielding structure 142 may be fabricated by infrared pass material. The feature of the integration unit U11 is that the light shielding structure 142 can be made of infrared pass material, and the light source 144 is infrared light source. When the light source 144 emits incident light, the light shielding structure 142 allows the incident light to pass through and shields other non-infrared light, so that the sensing photodiode D11 can sense the incident light, reduce noise, and increase the ration of correctly received signals.

Figure 16:
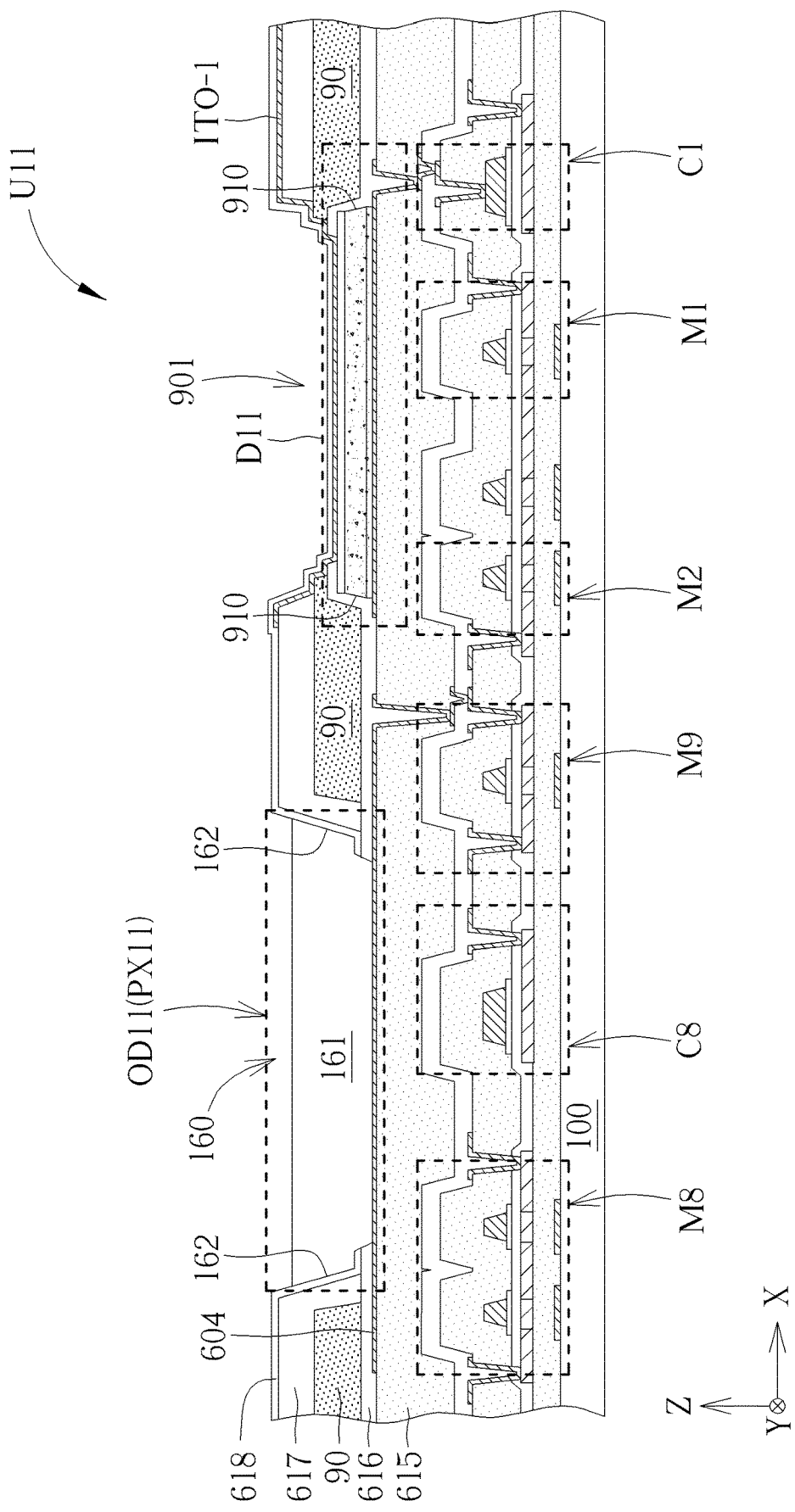
FIG. 16 is a cross-sectional view of a structure design of the integration unit according to an embodiment of the disclosure.

FIG. 16 a cross-sectional vie of a structure design of the integration unit U11 according to an embodiment of the disclosure. The same stacked layers (e.g., the conductive layers 600, 601, 602, 603 and the insulating layer 611, 612, 613, 614) are not denoted in FIG. 16, and are not described herein. Differences FIG. 16 and FIG. 8 is that the insulating layers 616, 617 and 618 have an opening 160, the display medium layer 161 is disposed in the opening 160, and is electrically connected with the display transistor through the conductive layer 604, to emit a single color light. Furthermore, the sides 910 of the sensing photodiode D11 is surrounded by the light shielding structure 90, and sides 162 of the pixel unit PX11 is also surrounded by the pixel unit PX11.

In this embodiment, the pixel units PX11_16 is corresponding to the transistor M8, the transistor M9, and the capacitor C8 connected in parallel. In this embodiment, a region of the pixel unit PX11, such as a dashed box in FIG. 16, may include corresponding stacked layers such as the conductive layer 604, the display medium layer 161. The dashed box in FIG. 16 is only an example, but is not limited thereto.

Figure 17:
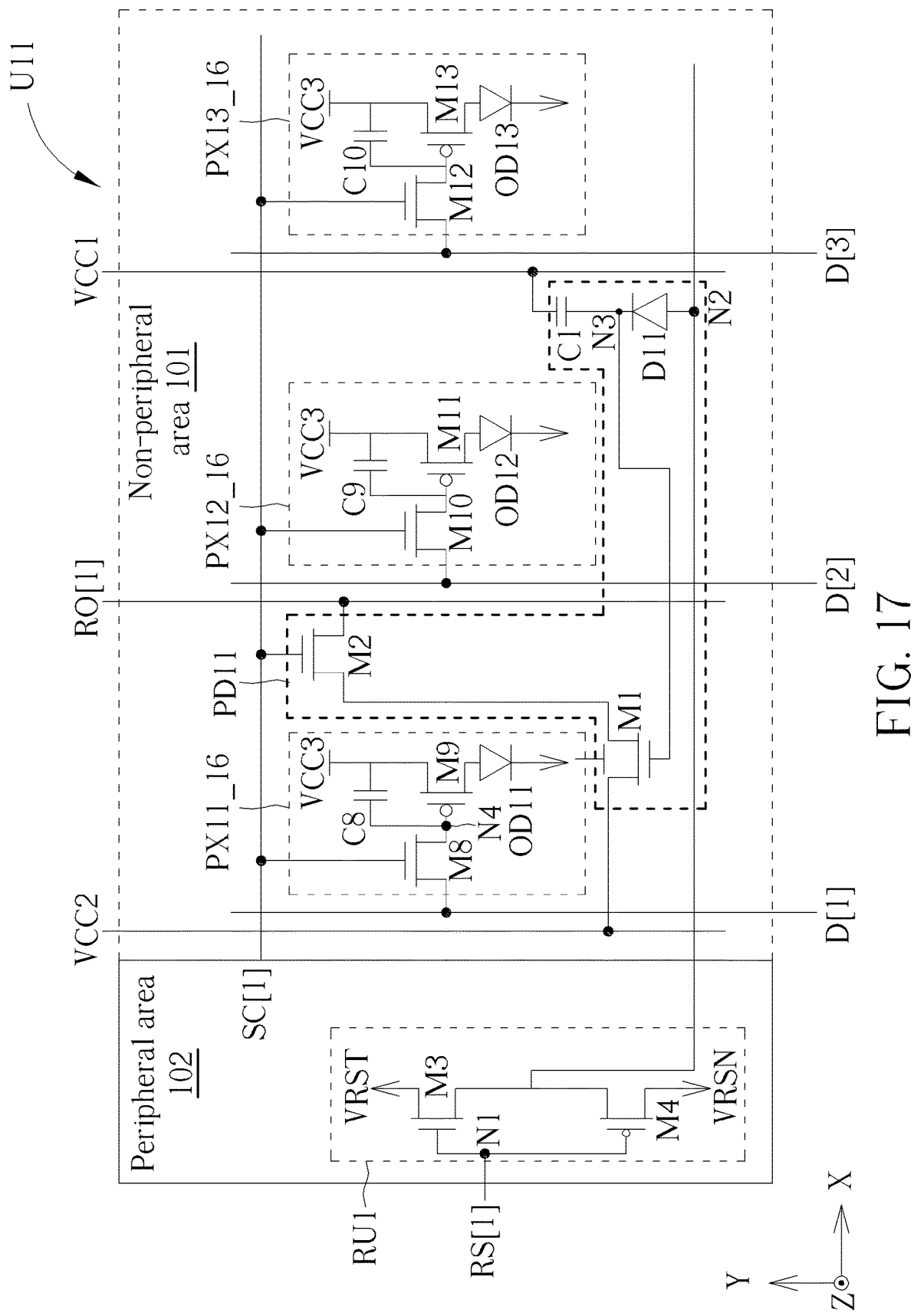
FIG. 17 is an equivalent circuit diagram of an integration unit according to an embodiment of the disclosure.

FIG. 17 is an equivalent circuit diagram of the integration unit U11 according to an embodiment of the disclosure. A pixel units PX11_16 is corresponding to the transistor M8, the transistor M9, and the capacitor C8 connected in parallel with each other. A pixel unit PX12_16 is corresponding to the transistors M10 and M11 and the capacitance C9 connected in parallel with each other. A pixel units PX13_16 is corresponding to the transistors M12 and M13 and the capacitance C10 connected in parallel with each other.

Taking the pixel unit PX11_16 as an example, the transistor M8 includes a control terminal, a first terminal, and a second terminal. The control terminal of the transistor M8 is coupled to the row selecting signal SC[1], and the first terminal of the transistor M8 is coupled to the data signal D[1], and the second terminal of the transistor M8 is coupled to the node N4. The transistor M9 includes a control terminal, a first terminal and a second terminal. The control terminal of the transistor M9 is coupled to the node N4, the first terminal of the transistor M9 is coupled to the bias voltage VCC3, and the second terminal of the transistor M9 is coupled to an anode of a light emitting element OD11. The capacitor C8 includes a first terminal and a second terminal. The first terminal of the capacitor C8 is coupled to the node N4, and the second terminal of the capacitor C8 is coupled to the bias voltage VCC2. The light emitting element OD11 includes an anode and a cathode. The anode of the light emitting element OD11 is coupled to the second terminal of the transistor M9, and the cathode of the light emitting element OD11 is coupled to the bias voltage VSS. In the present embodiment, the light emitting element OD11 may be, for example, a light emitting diode, and the light emitting diode may include, for example, organic light emitting diode (OLED), Mini Light-Emitting Diode, Micro light-diode emitting, a quantum light emitting diode (QD-LED), but is not limited thereto.

In summary, the disclosure is advantageous in that the disclosure may integrate a display function and a fingerprint recognition function in the electronic device 10. The disclosure is further advantageous in that the reset units RU1 . . . Rum are disposed in the peripheral area 102, which increases available area of the integration units U11 . . . Umn in the non-peripheral area 101, so as to improve fingerprint recognition performance and display performance of the non-peripheral area 101. The disclosure is further advantageous in that the sensing unit PD11 . . . PDmn and the pixel unit PX may be disposed on the same substrate, to reduce the number of stacked layers required by the electronic device 10.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
a first substrate, comprising a non-peripheral area and a peripheral area;
a first reset unit, disposed in the peripheral area;
a first integration unit, disposed in the non-peripheral area, comprising:
a first sensing unit, wherein the first sensing unit comprises a first sensing photodiode, and the first sensing photodiode is directly connected to the first reset unit; and
a first pixel unit, coupled to the first sensing unit;
a first light shielding structure, disposed on the first substrate, wherein sides of the sensing photodiode is surrounded by the first light shielding structure, the first light shielding structure comprises a first opening, and the first opening exposes a part of the sensing photodiode;
a second substrate, corresponding to the first substrate; and
a second light shielding structure, disposed on the second substrate and comprising a plurality of second openings;
wherein one of the plurality of second openings is corresponding to the first opening.

2. The electronic device of claim 1, wherein the electronic device comprises:
a scan driver, disposed in the peripheral area, for generating m row selecting signals, wherein the first sensing unit and the first pixel unit are coupled to one of the m row selecting signals, and wherein m is a positive integer greater than zero.

3. The electronic device of claim 2, wherein the electronic device comprises:
a data driver, disposed in the peripheral area; and
a readout circuit, disposed in the peripheral area;
wherein the first pixel unit is coupled to the data driver, and the first sensing unit is coupled to the readout circuit.

4. The electronic device of claim 1, wherein the electronic device comprises:
a second integration unit, disposed in the non-peripheral area, comprising:
a second sensing unit, coupled to the first reset unit; and
a second pixel unit, coupled to the second sensing unit.

5. The electronic device of claim 4, wherein the electronic device comprises:
a second reset unit, disposed in the peripheral area;
a third integration unit, disposed in the non-peripheral area, comprising:
a third sensing unit; and
a third pixel unit, coupled to the third sensing unit; and
a fourth integration unit, disposed in the non-peripheral area, comprising:
a fourth sensing unit; and
a fourth pixel unit, coupled to the fourth sensing unit;
wherein the third sensing unit and the fourth sensing unit are coupled to the second reset unit.

6. The electronic device of claim 1, wherein the first sensing unit comprises:
a transistor, coupled to the sensing photodiode;
wherein the sensing photodiode is overlapped with at least a part of the transistor.

7. The electronic device of claim 1, wherein the first sensing unit comprises:
   a transistor, comprising a double gate structure.

8. The electronic device of claim 1, wherein the electronic device comprises:
   a third light shielding structure, disposed on the sensing photodiode and covering the part of sensing photodiode.

9. An optical in-display biometric feature recognition device, comprising:
   a first substrate, comprising a non-peripheral area and a peripheral area;
   a first reset unit, disposed in the peripheral area;
   a first integration unit, disposed in the non-peripheral area, comprising:
      a first sensing unit, wherein the first sensing unit comprises a first sensing photodiode, and the first sensing photodiode is directly connected to the first reset unit; and
      a first pixel unit, coupled to the first sensing unit;
   a first light shielding structure, disposed on the first substrate, wherein sides of the sensing photodiode is surrounded by the first light shielding structure, the first light shielding structure comprises a first opening, and the first opening exposes a part of the sensing photodiode;
   a second substrate, corresponding to the first substrate; and
   a second light shielding structure, disposed on the second substrate and comprising a plurality of second openings;
   wherein one of the plurality of second openings is corresponding to the first opening.

10. The optical in-display biometric feature recognition device of claim 9, wherein the optical in-display biometric feature recognition device comprises:
   a scan driver, disposed in the peripheral area, for generating m row selecting signals, wherein the first sensing unit and the first pixel unit are coupled to one of the m row selecting signals, and wherein m is a positive integer greater than zero.

11. The optical in-display biometric feature recognition device of claim 10, wherein the optical in-display biometric feature recognition device comprises:
   a data driver, disposed in the peripheral area; and
   a readout circuit, disposed in the peripheral area;
   wherein the first pixel unit is coupled to the data driver, and the first sensing unit is coupled to the readout circuit.

12. The optical in-display biometric feature recognition device of claim 9, wherein the optical in-display biometric feature recognition device comprises:
   a second integration unit, disposed in the non-peripheral area, comprising:
      a second sensing unit, coupled to the first reset unit; and
      a second pixel unit, coupled to the second sensing unit.

13. The optical in-display biometric feature recognition device of claim 12, wherein the optical in-display biometric feature recognition device comprises:
   a second reset unit, disposed in the peripheral area;
   a third integration unit, disposed in the non-peripheral area, comprising:
      a third sensing unit; and
      a third pixel unit, coupled to the third sensing unit; and
   a fourth integration unit, disposed in the non-peripheral area, comprising:
      a fourth sensing unit; and
      a fourth pixel unit, coupled to the fourth sensing unit;
   wherein the third sensing unit and the fourth sensing unit are coupled to the second reset unit.

14. The optical in-display biometric feature recognition device of claim 9, wherein the first sensing unit comprises:
   a transistor, coupled to the sensing photodiode;
   wherein the sensing photodiode is overlapped with at least a part of the transistor.

15. The optical in-display biometric feature recognition device of claim 9, wherein the first sensing unit comprises:
   a transistor, comprising a double gate structure.

16. The optical in-display biometric feature recognition device of claim 9, wherein the optical in-display biometric feature recognition device comprises:
   a third light shielding structure, disposed on the sensing photodiode and covering the part of sensing photodiode.

* * * * *